United States Patent
Otsuka et al.

(10) Patent No.: US 6,332,861 B1
(45) Date of Patent: Dec. 25, 2001

(54) AUTOMATIC BLADED TOOL CHANGER

(75) Inventors: Kazuhisa Otsuka; Masaru Oda; Kenji Takahashi, all of Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/592,867

(22) Filed: Jun. 13, 2000

(30) Foreign Application Priority Data

Jun. 16, 1999 (JP) .................................................. 11-169219

(51) Int. Cl.[7] .................................................. B23Q 3/157
(52) U.S. Cl. .............................. 483/55; 483/13; 483/901; 901/41
(58) Field of Search .................... 483/7, 30, 901, 483/33, 47, 54, 55; 901/42, 41, 36; 409/218, 233, 232; 403/342

(56) References Cited

U.S. PATENT DOCUMENTS

| | | | |
|---|---|---|---|
| 3,521,525 | * | 7/1970 | Williamson ................ 409/218 X |
| 4,583,894 | * | 4/1986 | Mitchell ...................... 409/233 |
| 4,655,630 | * | 4/1987 | Rinehart ...................... 403/342 |
| 4,777,715 | * | 10/1988 | Roberts ...................... 483/30 |
| 4,784,421 | * | 11/1988 | Alvite ...................... 483/901 X |
| 4,819,320 | * | 4/1989 | Cairns et al. ................ 483/7 |
| 4,928,381 | * | 5/1990 | Yaguchi et al. ............. 483/47 |
| 4,993,139 | * | 2/1991 | Burry et al. ................. 483/7 |
| 5,277,688 | * | 1/1994 | Whittington ................ 483/33 |
| 5,423,643 | * | 6/1995 | Suzuki et al. ............... 409/232 |
| 5,752,904 | | 5/1998 | Irri ............................ 483/13 |

FOREIGN PATENT DOCUMENTS

| | | | |
|---|---|---|---|
| 3208621 | * | 9/1983 | (DE) ...................... 483/901 |
| 3634018 A1 | | 4/1988 | (DE) . |
| 4007072 A1 | | 9/1991 | (DE) . |
| 61-044547 | * | 3/1986 | (JP) ...................... 483/901 |
| 62-39146 | * | 2/1987 | (JP) ...................... 483/901 |

\* cited by examiner

*Primary Examiner*—William Briggs
(74) *Attorney, Agent, or Firm*—Staas & Halsey LLP

(57) ABSTRACT

A floating cylinder 12 and a rotating shaft fixing cylinder 11 are attached to a flange RB1 at the distal end of a robot arm via an attaching member 17. Attached to the floating cylinder 12 is a rotary tool 10. To mount or demount a bladed tool to or from a collet chuck 13, the rotating shaft fixing cylinder 11 is operated to advance a stopper 15 so that a rotating shaft 14 of the rotary tool is locked. The chuck nut of the collet chuck 13 is inserted and fixed into a collet fixing groove in which the bladed tool is stored. The robot is operated so as to rotate the flange RB1, by which the rotating shaft 14 and the chuck nut of the collet chuck 13 are rotated relatively to tighten or loosen the bladed tool in the collet chuck 13.

11 Claims, 5 Drawing Sheets

AUTOMATIC BLADED TOOL CHANGER

BACKGROUND OF THE INVENTION

1. Field of the Invention

The present invention relates to an automatic bladed tool changer and, more particularly, to an automatic bladed tool changer for a bladed tool mounted to the distal end of a robot arm.

2. Description of the Prior Art

To automatically change a bladed tool for machining such as deburring mounted to a robot, one rotary tool and one automatic tool changer (ATC) are conventionally installed for each bladed tool to change the bladed tool itself. In this case, it is necessary to provide protection against dust for an ATC mounting/demounting face on a tool table.

Also, as disclosed in Japanese Patent Application Laid-Open No. 8-57730, a technique has been well known in which a tightening and loosening mechanism such as a nut runner is provided on the side of peripheral equipment other than a robot to automatically change a bladed tool.

Further, when a bladed tool is mounted to or demounted from the rotary tool, in order to align the rotational position of the rotary tool with the phase of the bladed tool, the rotational angle of the rotary tool is detected by using an angle detector or the like, and the rotating shaft of the rotary tool is fixed so as to agree with the phase of the bladed tool. Thereafter, the bladed tool is mounted to or demounted from the rotary tool. Further, by additionally machining the bladed tool itself or by reconstructing it by, for example, mounting an adapter thereon, the mounting and demounting of the bladed tool to and from the rotary tool is performed easily.

Another method is used in which the operator changes a bladed tool by using a special-purpose change jig.

In the above-described conventional bladed tool change, when an ATC is used, rotary tools and ATCs corresponding to the number of kinds of tools are needed. Therefore, the number of bladed tools used increases, which leads to an increase in cost. Also, when an ATC is used, an ATC bed also requires a complicated mechanism such as measures against dust and equipment for mounting and demounting, which also causes an increase in price. Further, the installation space is increased, so that the number of kinds of bladed tools is limited. Besides, in some cases, the work must be distributed to a plurality of processes because of the limitation of the work area of robot.

When peripheral equipment dedicated to bladed tool change is installed, there arises a problem in that the price increases accordingly, and a large installation space is needed.

Further, when an angle detector or the like is used to mount and demount a bladed tool to and from the rotary tool, the price undesirably increases accordingly.

Also, the method in which the mounting and demounting of a bladed tool is made easy by the reconstruction of a commercially sold rotary tool, the additional machining of a bladed tool, the addition of a special-purpose adapter, etc. has a problem in that the price is increased by the reconstruction of equipment.

In a bladed tool changing work performed by the operator, failed or insufficient tightening of bladed tool, variations in bladed tool extension, etc. occur, which causes the occurrence of defective machining due to the bladed tool. In particular, when the bladed tool changing work is performed by the operator, a special-purpose jig for controlling the bladed tool extension is needed, which also increases the cost, and prevents the work from being made automatic.

OBJECTS AND SUMMARY OF THE INVENTION

The present invention has been made to solve the above-described problems, and accordingly an object thereof is to provide an automatic bladed tool changer capable of automatically changing a bladed tool on a rotary tool attached to the distal end of a robot arm at a low cost.

The automatic bladed tool changer in accordance with the present invention automatically mounts and demounts a bladed tool to and from the rotary tool having a collet chuck attached to a flange at the distal end of the robot arm.

In a first mode of the automatic bladed tool changer in accordance with the present invention, a robot is controlled according to a program by control means so as to open and close the collet chuck to mount and demount a bladed tool to and from the rotary tool.

In a second mode of the automatic bladed tool changer in accordance with the present invention, rotating shaft locking means for fixing a rotating shaft of the rotary tool is attached to the flange, and the robot and the rotating shaft locking means are operated according to a program by control means so that a chuck nut is fixed by chuck nut fixing means provided on bladed tool storage means in which the bladed tool is stored and the rotating shaft of the rotary tool is fixed by the rotating shaft locking means, so that the chuck nut and the rotating shaft are rotated relatively to open and close the collet chuck, whereby the bladed tool is mounted and demounted to and from the rotary tool.

The automatic bladed tool changer according to the first or second mode can adopt the following embodiments.

The control means has means for performing bladed tool tightening of the collet chuck by the robot operation using a predetermined torque limit value set on the robot.

The control means has means for estimating a disturbance torque of a tightening shaft by using an observer when the bladed tool tightening of the collet chuck is performed by the robot operation and for judging that the tightening is completed when the estimated value exceeds a predetermined threshold value.

The rotating shaft locking means is provided with a cylinder for reciprocating a stopper for engaging with the rotating shaft and locking the same, the stopper is pressed against the rotating shaft by driving the cylinder repeatedly, the rotating shaft is rotated slightly and is brought to a rotation phase in which the stopper engages with the rotating shaft and is fixed, and the stroke of the cylinder is monitored to detect that the rotating shaft is fixed to the stopper, by which the rotating shaft is fixed at this position as the completion of locking.

The control means sets a bladed tool extension to a predetermined value by pressing the bladed tool on a bladed tool positioning stopper by operating the robot.

The control means stores in storage means a holding position or a position returned from the holding position through a predetermined rotational angle after the bladed tool is tightened and held by the collet chuck by the robot operation, and uses the stored position as the start position for bladed tool removing operation when the bladed tool is removed from the collet chuck.

The control means is a robot controller.

According to the present invention, a bladed tool can be mounted and demounted easily to and from the rotary tool attached to the robot.

In particular, since the robot controller can also be used as the control means, the addition of special hardware is not needed, so that the automatic bladed tool changer can be configured at a low cost.

Moreover, even when bladed tools to be used are increased, the bladed tool storage apparatus has only to be installed additionally, so that the installation space can be saved.

Since the tightening torque of bladed tool can be set and controlled and the bladed tool extension can be controlled by a robot, time and labor for manual control and a special-purpose jig are unnecessary, so that the cost can be reduced and the quality of machining work (for example, deburring work) using the robot and rotary tool can be upgraded.

Since a commercially sold bladed tool and rotary tool can be used, additional machining of the bladed tool or rotary tool is unnecessary, which leads to a reduction in cost. Further, since only one rotary tool is needed for a plurality of bladed tools, a plurality of rotary tools and ATCs that have been needed conventionally are unnecessary, which accordingly reduces the price. Also, since the ATC is not needed, a mechanism for dustproof measures for a tool table is unnecessary, so that the space and cost can be decreased.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
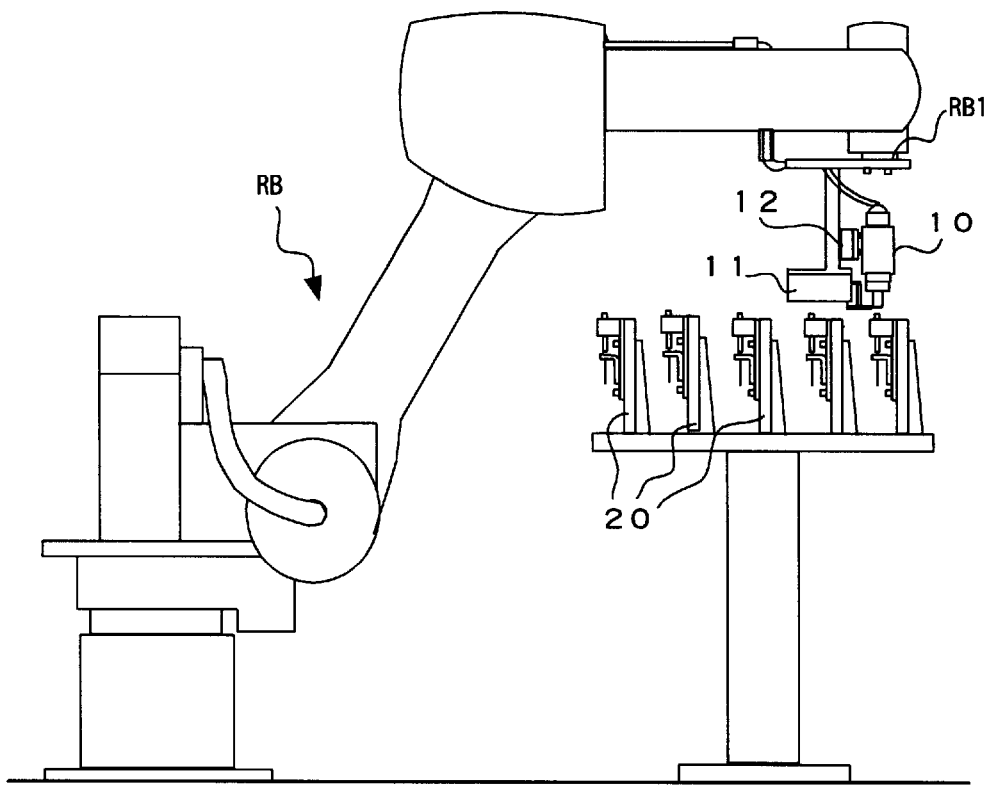
FIG. 1 is a schematic view showing one embodiment of an automatic bladed tool changer in accordance with the present invention.

FIG. 1 shows the outline of one embodiment of an automatic bladed tool changer in accordance with the present invention.

As shown in FIG. 1, a floating cylinder 12 driven by air and a rotating shaft fixing cylinder 11 driven by air to fix a rotating shaft of a rotary tool 10 are attached to a flange RB1 of a wrist at the distal end of an arm of a robot RB. The rotary tool 10 is attached to the floating cylinder 12.

This robot RB may be of any type, but the wrist at the distal end of robot RB must be moved in a predetermined space, and at least the flange at the distal end of the robot arm must be rotated around the axis perpendicular to the flange face. Specifically, it is necessary that both the rotary tool 10 and the rotating shaft fixing cylinder 11, attached to the flange RB1 of the wrist at the distal end of arm, can rotate.

Because an ordinary robot has such a flange RB1, the ordinary robot can be used.

Bladed tool storage apparatuses 20 store various bladed tools. The bladed tool stored in this bladed tool storage apparatus 20 is automatically mounted to a collect chuck of the rotary tool 10 attached to the distal end of arm of the robot RB, or automatically dismounted to be stored in the bladed tool storage apparatus 20.

Figure 2:
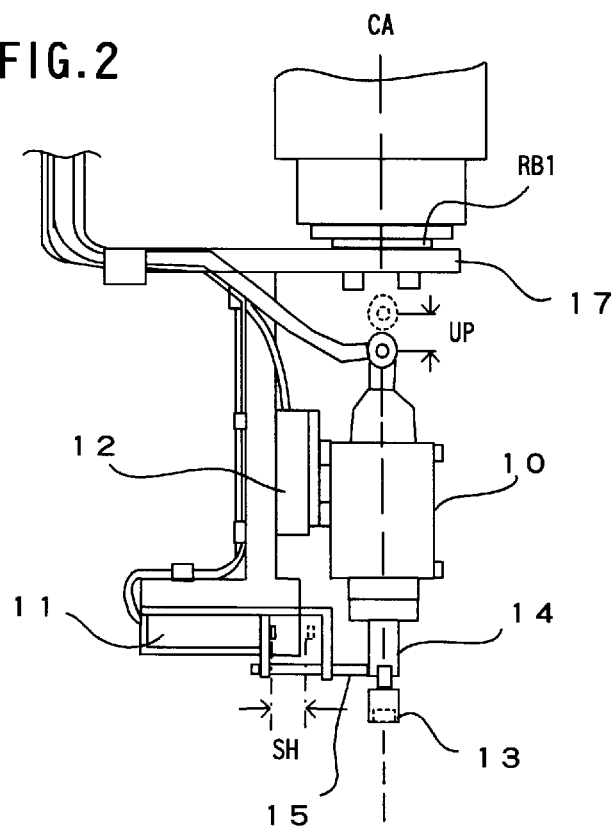
FIG. 2 is a view showing a construction in which elements constituting the automatic bladed tool changer shown in FIG. 1 are attached to a flange at the distal end of a robot arm.

FIG. 2 shows a construction in which elements constituting the automatic bladed tool changer shown in FIG. 1 are attached to the flange RB1 at the distal end of the robot arm.

As shown in FIG. 2, an attaching member 17 is fixed to the flange RB1 at the distal end of the robot arm. The attaching member 17 is fitted with either one of a fixed portion and movable portion of the floating cylinder 12 and the rotating shaft fixing cylinder 11. The other of the fixed portion and movable portion of the floating cylinder 12 is fitted with the rotary tool 10. At the distal end of a rotating shaft 14 of the rotary tool 10 is fixed a collet chuck 13.

The rotation axis of the flange RB1 and the rotation axis of the rotary tool 10 are arranged on the same line.

A stopper 15 having a shape which matches with the external shape of the rotating shaft 14 on the distal end thereof is attached to the movable portion of the rotating shaft fixing cylinder 11. In this embodiment, at least a portion of the rotating shaft 14 engaging with the stopper 15 is formed by two opposed flat faces and the other opposed arcuate faces. The distal end of the stopper 15 is formed into a fork shape so as to hold the opposed flat faces of the rotating shaft 14. When the distal end of the stopper 15 engages with the rotating shaft 14, the stopper 15 is at maximum extension. A sensor such as a limit switch (not shown) for detecting this maximum extending position is provided. This sensor detects the situation in which the stopper 15 engages with the rotating shaft 14 so that the rotation of the rotating shaft 14 is inhibited and locked.

When the chuck nut of the collet chuck 13 is pressed against a collet fixing groove of the bladed tool storage apparatus 20, as described later, but the the chuck nut of the collet chuck 13 fails to engage with the collet fixing groove, the rotary tool 10 is moved by the action of the floating cylinder 12 in the direction opposite to the pressing direction, that is, in the upward direction in FIG. 2. A sensor, not shown, is provided to detect the arrival of the tool 10 at a preset position by such movement.

Figure 3:
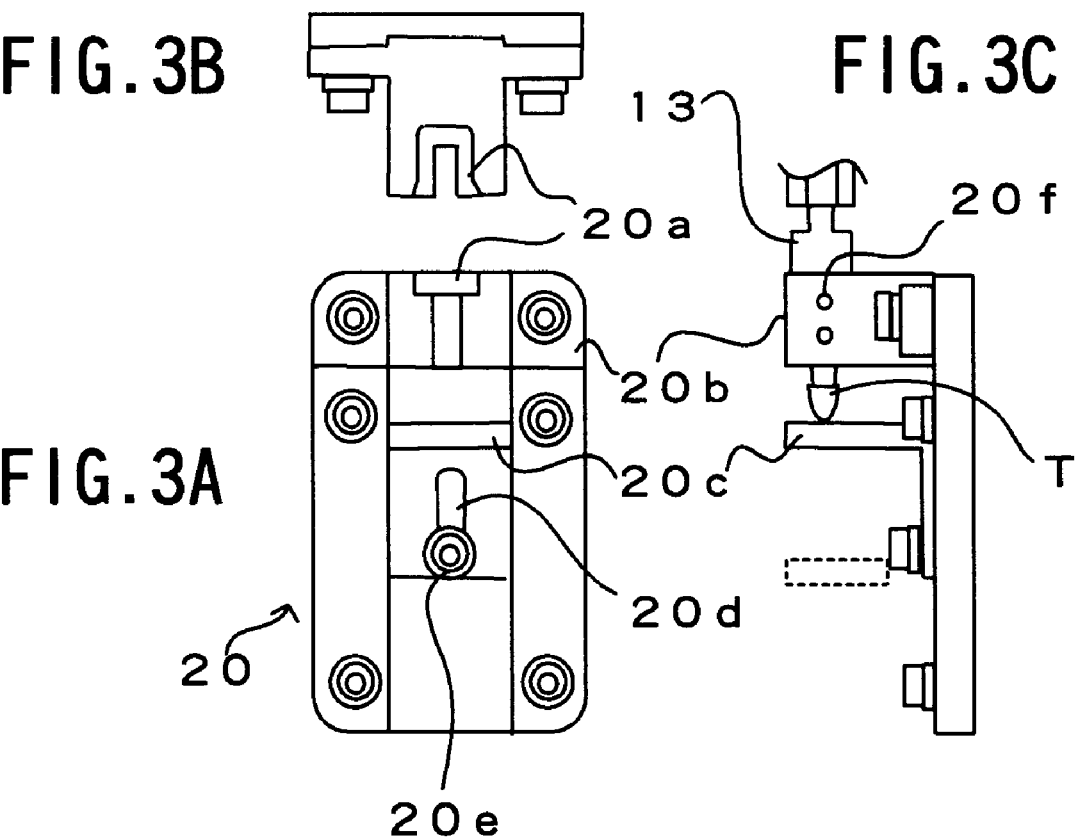
FIGS. 3A to 3C are explanatory views of a bladed tool storage apparatus in the automatic bladed tool changer shown in FIG. 1.

FIGS. 3A to 3C are explanatory views of the bladed tool storage apparatus 20. FIG. 3A is a front view, FIG. 3B is a plan view taken from the top of FIG. 3A, and FIG. 3C is a side view in which FIG. 3A is viewed from the side.

A bladed tool fixing block 20b is provided at the upper end portion of the bladed tool storage apparatus 20. Provided in the center of the bladed tool fixing block 20b is a T-shaped collet fixing groove 20a which receives and holds a bladed tool T and engages with the inserted chuck nut of the collet chuck 13.

Also, a bladed tool positioning stopper 20c is provided under the bladed tool fixing block 20b. The bladed tool positioning stopper 20c is formed with a guide groove 20d engaging with a hold pin 20e. The bladed tool positioning stopper 20c is guided along the guide groove 20d by the hold pin 20e, and is held so as to be movable vertically in FIG. 3A.

When the bladed tool T is stored in the bladed tool storage apparatus 20, the bladed tool T passes through the collet fixing groove 20a and the tip end of the bladed tool T is supported and held by the bladed tool positioning stopper 20c. Reference numeral 20f denotes a bladed tool fixing ball plunger. FIG. 3C shows a state in which the collet chuck 13 is engaged with the collet fixing groove 20a and the bladed tool T is going to be held or released.

Figure 4:
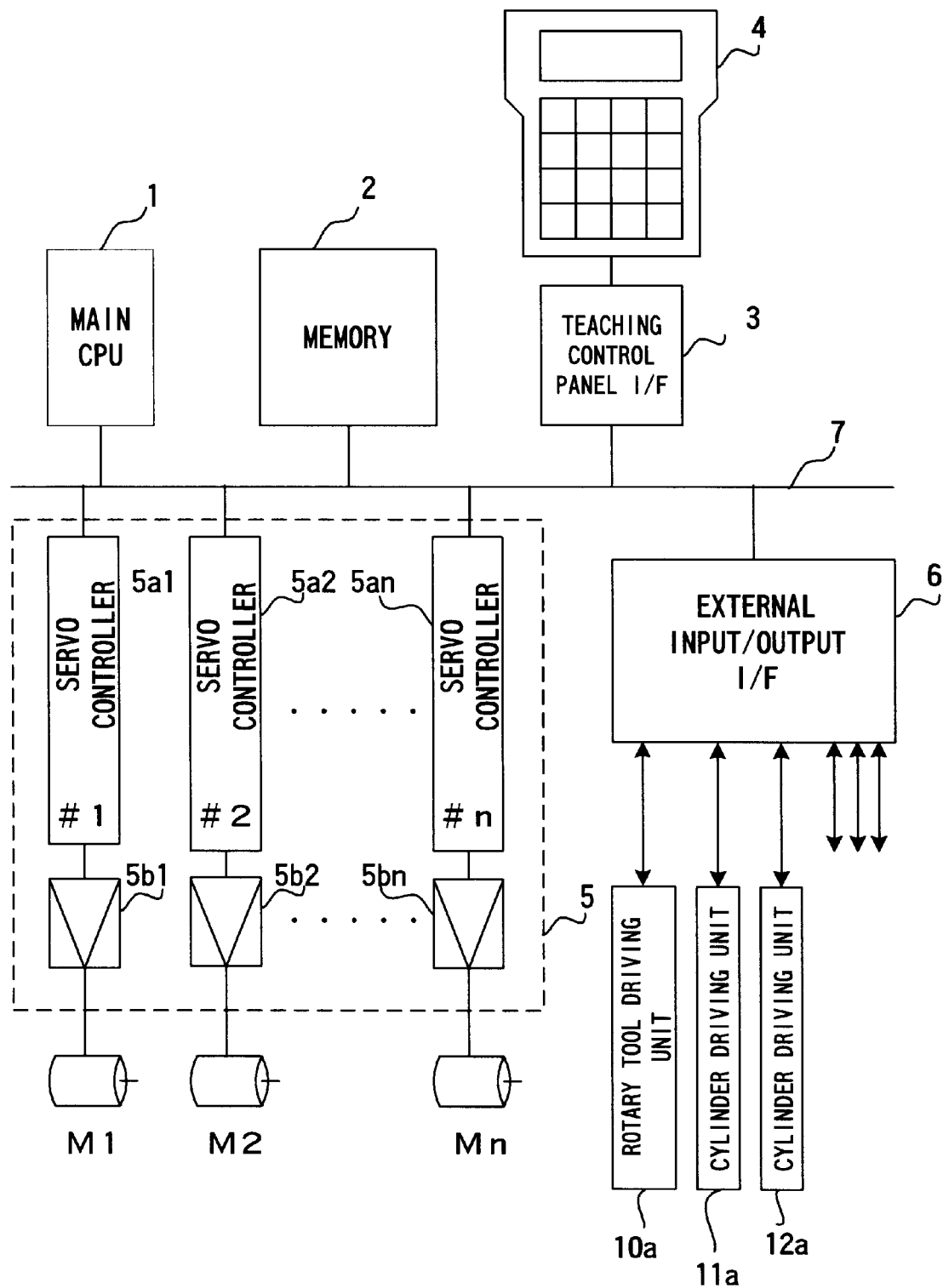
FIG. 4 is a block diagram showing an essential part of a robot controller constituting control means in the automatic bladed tool changer shown in FIG. 1.

FIG. 4 is a block diagram showing an essential part of a robot controller also constituting a control section in the automatic bladed tool changer in accordance with the present invention. This robot controller has substantially the same construction as that of a conventional robot controller.

Connected to a bus denoted by reference numeral 7 are a main processor (hereinafter referred to simply as a processor) 1, memory 2 comprising a RAM, a ROM and nonvolatile memory (for example, EEPROM), teaching control panel interface 3, interface 6 for external equipments, and servo control section 5. Also, a teaching control panel 4 is connected to the teaching control panel interface 3.

A system program supporting basic functions of the robot and robot controller is stored in the ROM of the memory 2. An operation program for the robot that is taught according to application and relating preset data are stored in the nonvolatile memory of the memory 2. The RAM of the memory 2 is used as a storage area for temporarily storing data for various operations to be performed by the processor 1.

The servo control section 5 is provided with servo controllers 5a1 to 5an corresponding to the number of movable axes of the robot RB. Each of the servo controllers 5a1 to 5an, which is made up of a processor, ROM, RAM, etc., carries out loop control of the position and speed of a servomotor for driving each axis, and further carries out current loop control. The servo controller constitutes a digital servo controller that carries out loop control of position, speed, and current by means of software. The output of the servo controllers 5a1 to 5an drives servomotors M1 to Mn for each axis via servo amplifiers 5b1 to 5bn, respectively.

Although not shown in the figure, each of the servomotors M1 to Mn is provided with a position/speed detector so that the position and speed of each servomotor detected by the position/speed detector is fed back to each of the servo controllers 5a1 to 5an.

The input/output interface 6 is, in relation to the present invention, connected with a rotary tool driving unit 10a for driving the rotary tool 10, rotating shaft fixing cylinder driving unit 11a for driving the rotating shaft fixing cylinder 11, and floating cylinder driving unit 12a for driving the floating cylinder 12.

Further, the input/output interface 6 is connected with a sensor for detecting the maximum extension position of the stopper 15 described before, a sensor for detecting the rising position of the rotary tool 10, and other sensors provided on the robot and actuators and sensors for peripheral equipment.

The above-described configuration of the robot controller is exactly the same as that of a conventional robot controller. In the present invention, this robot controller is used as control means for the automatic bladed tool changer in accordance with the present invention. Therefore, a control program for automatic bladed tool change, described below, is stored beforehand in the memory 2.

Figure 5:
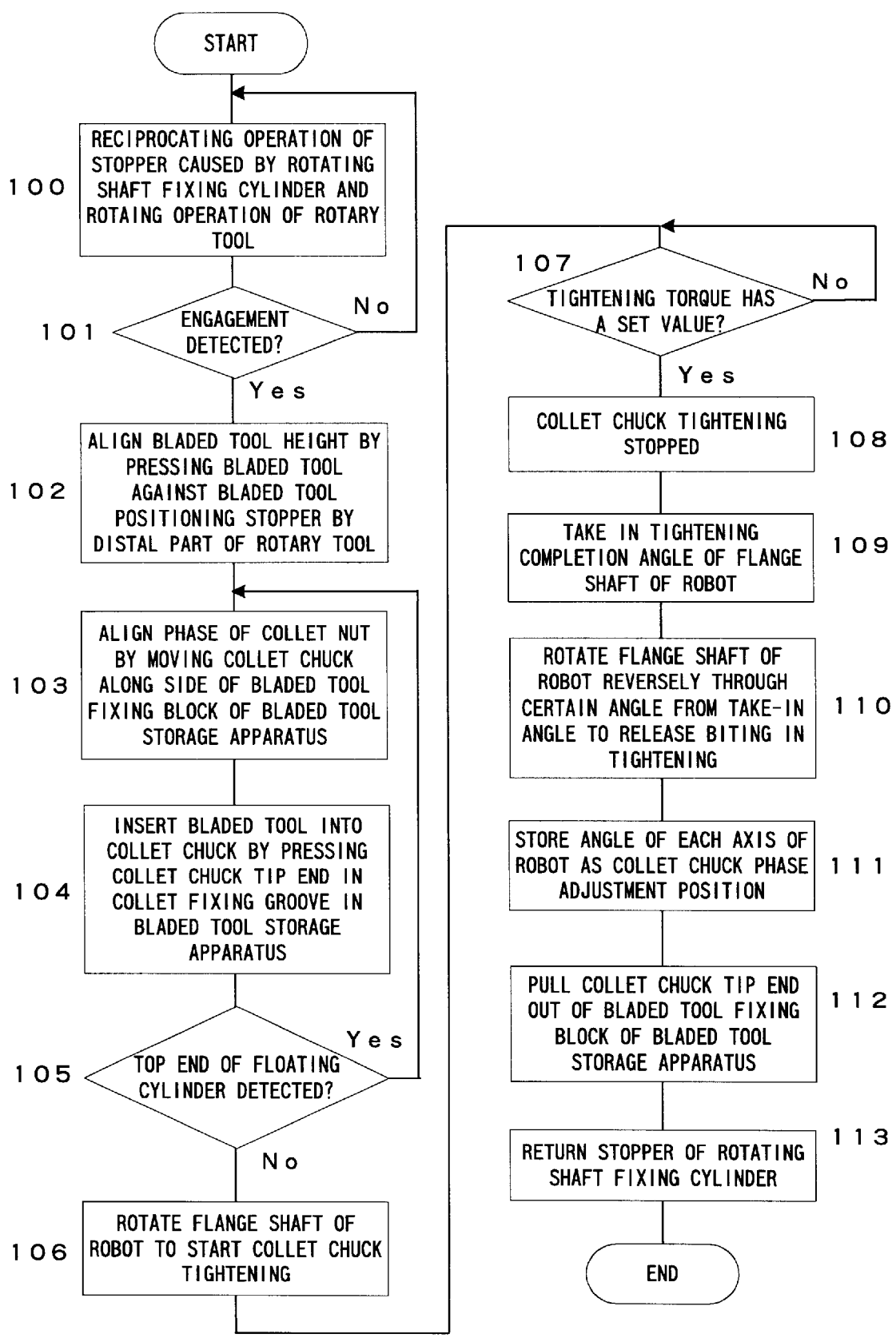
FIG. 5 is a flowchart for a bladed tool installing operation in the automatic bladed tool changer shown in FIG. 1.

FIG. 5 is a flowchart for a bladed tool installing process.

When a bladed tool installing command is given by a taught machining program or from the teaching control panel 4 or a not illustrated control panel etc, the processor 1 of the robot controller (control means for the automatic bladed tool changer) performs a reciprocating operation of the stopper 15 by the rotating shaft fixing cylinder 11 and a predetermined amount of rotating operation of the rotary tool 10, and judges whether or not a detection signal is generated from the sensor for detecting the maximum extending position of the stopper 15 (Steps 100 and 101).

Specifically, the stopper 15 is extended by driving the rotating shaft fixing cylinder 11 via the external input/output interface 6 and the rotating shaft fixing cylinder driving unit 11a. Then, if a detection signal is not generated from the sensor, the stopper 15 is retracted (see SH of FIG. 2) and the rotary tool 10 is driven via the rotary tool driving unit 10a to rotate the rotating shaft 14 by a predetermined amount. Then the stopper 15 is extended again.

The above-described operation is executed repeatedly until a detection signal is generated from the sensor for detecting the maximum extending position of the stopper 15. As a result, the rotating shaft 14 rotates in succession, and the stopper 15 extends to try to engage with the rotating shaft 14 positioned at each rotating position. When the rotating shaft 14 rotates up to a position where it engages with the fork-shaped distal end of the stopper 15 and engages with the stopper 15, the amount of extension of the stopper 15 becomes maximum. The detection of such maximum amount of extension with the sensor would prove the engagement of the stopper 15 with the rotating shaft 14 (Step 101).

In the above-described engagement operation of the stopper 15 with the rotating shaft 14, the rotary tool 10 is driven and rotated every preset small amount. However, the operation may be such hat the rotary tool 10 itself is not driven and is held in a free state, the stopper 15 is reciprocated to be pressed against the rotating shaft 14, the rotating shaft 14 is slightly rotated by this pressing force, and the rotating shaft 14 is rotated to a position where the stopper 15 engages with the rotating shaft 14.

If the rotation of the rotating shaft 14 is locked by the stopper 15 as described above, the program proceeds to Step 102. In Step 102, the robot is operated so that the collet chuck 13 of the rotary tool 10 attached to the distal end of the robot arm is positioned at a position above the bladed tool storage apparatus 20 in which the commanded bladed tool T is stored. A command for movement to a predetermined position on the Z axis (upward axis in FIG. 1) is issued so that the bladed tool T stored in the bladed tool storage apparatus 20 is pressed by the collet chuck 13 at the distal end of the rotary tool 10, the bladed tool T is pressed against the bladed tool positioning stopper 20c, and the height of the bladed tool T is aligned.

Next, the chuck nut of the collet chuck 13 is moved along the side of the bladed tool fixing block 20b of the bladed tool storage apparatus 20, so that chuck nut of the collet chuck 13 is rotated, and the phases of the chuck nut of the collet chuck 13 and the collet fixing groove 20a are aligned with each other so that the collet chuck 13 engages with the collet fixing groove 20a (Step 103).

Thereafter, the distal end of the robot arm is moved to a predetermined position on the Z axis, the chuck nut of the collet chuck 13 is pressed into the collet fixing groove 20a in the bladed tool storage apparatus 20 while the floating cylinder 12 is driven, and the bladed tool is inserted in the collet chuck 13 (Step 104). At this time, if the phases of the chuck nut of the collet chuck 13 and the collet fixing groove 20a are not aligned with each other, the chuck nut of the collet chuck 13 cannot be fitted into the collet fixing groove 20a, so that the rotary tool 10 is raised relatively with respect to the attaching member 17 by a reaction force applied to the tip end of the collet chuck 13. If this rise (see UP in FIG. 2) is detected by a sensor (Step 105), the program returns to Step 103. Then, the phase of the chuck nut of the collet chuck 13 is changed, and the chuck nut of the collet chuck 13 is tried to be fitted into the coliet fixing groove 20a.

The fact that the top end of the floating cylinder 12 is not detected by the sensor even when the distal end of the robot arm moves up to the predetermined position on the Z axis in the collet chuck inserting operation proves the fact that the chuck nut of the collet chuck 13 has been fitted into the collet fixing groove 20a. In this case, the program goes to Step 106, where the robot is operated so that a shaft hereinafter referred to as a flange shaft) for rotating the flange RB1 around the flange center axis (CA) which is perpendicular to the face of the flange RB1 is rotated in the bladed tool tightening direction.

The chuck nut of the collet chuck 13 does not rotate because it is fitted into the collet fixing groove 20a of the bladed tool storage apparatus 20, and the rotating shaft 14 of the rotary tool 10 is held by the stopper 15, so that it cannot rotate relatively with respect to the rotary tool 10. If the flange shaft rotates in this state, the rotating shaft 14 rotates together with the attaching member 17 attached to the flange RB1, floating cylinder 12, rotary tool 10, and rotating shaft fixing cylinder 11. But, as the chuck nut of the collet chuck 13 is fixed, the chuck nut of the collet chuck 13 rotates with respect to the rotating shaft 14 relatively, so that the bladed tool T is tightened by the collet chuck 13.

As the bladed tool tightening by the collet chuck 13 makes progress, the driving current of the servomotor for driving the flange shaft increases. This driving current is detected. When the driving current reaches a preset current value corresponding to a preset torque, the drive of the flange shaft is stopped, assuming that the preset tightening torque is obtained (Steps 107 and 108).

Instead of detection of tightening torque by means of the driving current, the configuration may be such that a well-known disturbance estimation observer is incorporated beforehand in the servo controller for driving the flange shaft so that when a disturbance estimation value estimated by the disturbance estimation observer reaches the preset torque, it is assumed that the preset tightening torque can be obtained.

After tightening of the bladed tool is completed in this manner, the rotational position of the flange shaft at the completion is taken in. Specifically, the servomotor for driving the flange shaft is provided with the position detector as described before, so that the rotational angle of the flange shaft is read by a signal sent from the position detector (Step 109). Then, the flange shaft is rotated reversely (in the loosening direction) by a preset small angle from the taken-in angle, with the result that biting of the chuck nut into the collet fixing groove 20a caused in tightening of the bladed tool is released (Step 110), and the rotational angle of each axis of robot at this time is stored in the memory 2 as a collet chuck phase adjustment position (Step 111).

Subsequently, the robot RB is operated so that the distal end of the robot arm is moved by a predetermined amount upward on the Z axis to pull the collet chuck 13 out of the collet fixing groove 20a in the bladed tool fixing block 20b of the bladed tool storage apparatus 20 (Step 112), and the rotating shaft fixing cylinder 11 is driven to retract the stopper 15 and disengages the stopper 15 from the rotating shaft 14 (Step 113). The rotating shaft 14 is made in a rotatable state, that is, in a state in which machining can be performed by the bladed tool T mounted to the collet chuck 13, and then the bladed tool installing process is completed.

Figure 6:
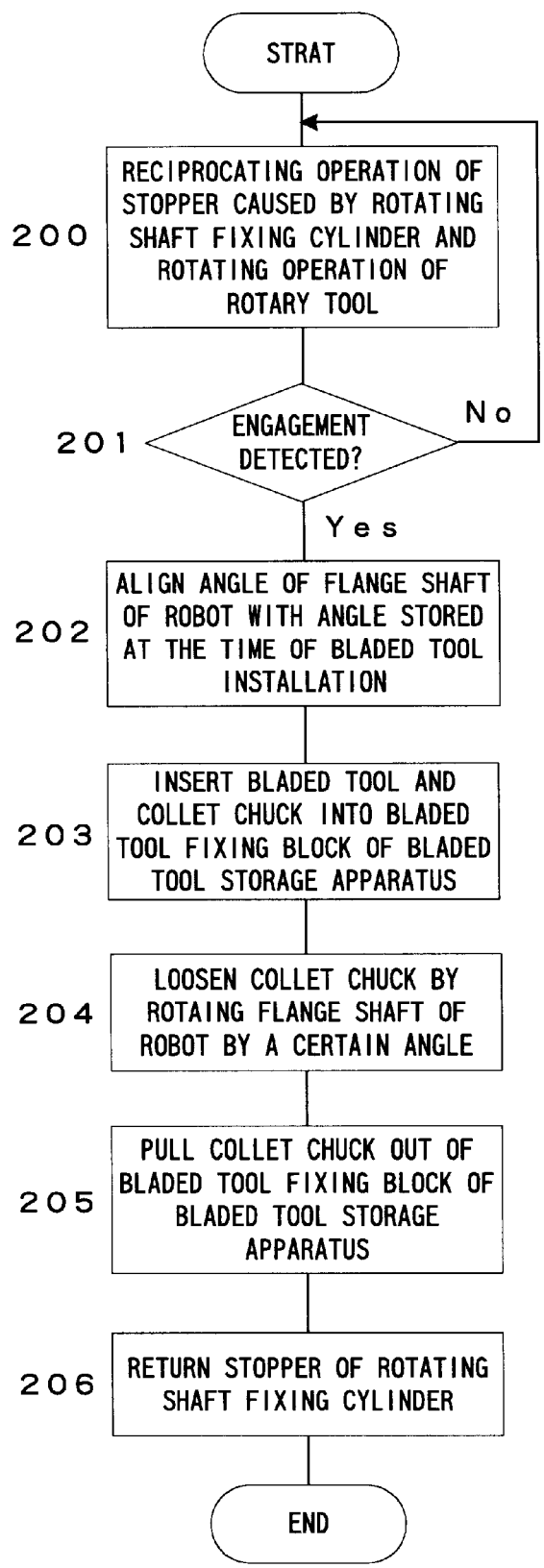
FIG. 6 is a flowchart for a bladed tool removing operation in the automatic bladed tool changer shown in FIG. 1.

FIG. 6 is a flowchart for a bladed tool removing process.

When a bladed tool removing command is read from the machining program, or when the bladed tool removing command is given from the teaching control panel 4 etc., the processor 1 of the robot controller performs the same operations as those in the aforementioned Steps 100 and 101. That is, the rotating shaft 14 of the rotary tool 10 is held by the rotating shaft fixing stopper 15 so that the rotation of the rotating shaft 14 is locked (Steps 200 and 201).

If the rotating shaft 14 of the rotary tool 10 is locked, the rotational angle of the flange shaft is caused to agree with the angle of the flange shaft stored in the memory 2 as the collet chuck phase adjustment position in Step 111 (Step 202), so that the distal end of the robot arm is positioned at a position above the bladed tool storage apparatus 20 into which the bladed tool is going to be stored (this position is set beforehand as a bladed tool storage start position so that the bladed tool mounted to the collet chuck 13 comes to a position above the bladed tool storage apparatus 20).

Next, the bladed tool T and the collet chuck 13 are lowered to a preset position in the Z axis direction so that they are fitted into the collet fixing groove 20a in the bladed tool fixing block 20b of the bladed tool storage apparatus 20 (Step 203).

Thereby, the chuck nut of the collet chuck 13 engages with the collet fixing groove 20a so that the rotation thereof is locked. Also, the rotation of the rotating shaft 14 of the rotary tool 10 is locked by the stopper 15. Then, the servomotor for driving the flange shaft of the robot RB is driven to rotate the flange RB1 by a preset angle, so that the collet chuck 13 is rotated in the loosening direction. As a result, as the chuck nut of the collet chuck 13 is kept fixed, the rotating shaft 14 of the rotary tool 10 rotates along with the rotation of the flange RB1. Therefore, the collet chuck 13 releases the bladed tool T held by the collet chuck 13 in a loosened state (Step 204).

Thereafter, the distal end of the robot arm is moved upward on the Z axis to a preset position, and then the collet chuck 13 is pulled out of the fixing block of the bladed tool storage apparatus 20 (Step 205). Then, the rotating shaft fixing cylinder 11 is operated to retract the stopper 15, with the result that the stopper 15 is disengaged from the rotating shaft 14 (Step 206), thereby completing the bladed tool removing process.

When a bladed tool changing command is given from the machining program etc., the bladed tool removing process shown in FIG. 6 is performed, and then, the bladed tool installing process shown in FIG. 5 is performed.

As described above, in the present invention, the controller of the robot can also serve as the control means for the automatic bladed tool changer. As a result, for the automatic bladed tool changer in accordance with the present invention, the minimum necessary hardware is only a stopper serving as rotating shaft locking means for locking the rotation of the rotating shaft of the rotary tool and driving means therefor. Also, when the robot controller does not serve as the control means for the automatic bladed tool changer, the configuration may be such that the control means for the automatic bladed tool changer and the robot controller are connected to each other, a command for the robot operation is issued from the automatic bladed tool changer to the robot controller, and the control means for the automatic bladed tool changer carries out controls of the rotary tool 10, rotating shaft fixing cylinder 11, floating cylinder 12, and the like.

What is claimed is:

1. An automatic bladed tool changer to automatically mount and demount a bladed tool, comprising:

a robot having an arm including a flange at a distal end thereof;

a rotary tool attached to said flange, said rotary tool including a collet chuck;

control means to open and close said collet chuck to mount and demount the bladed tool to and from said rotary tool, the robot being controlled according to a program by said control means; and a rotating shaft locking unit to fix a rotating shaft of said rotary tool, said collet chuck and said rotating shaft being rotated relative to each other to close and open said collet chuck to mount and demount the bladed tool to and from said rotary tool.

2. An automatic bladed tool changer to automatically mount and demount a bladed tool comprising:

a robot having an arm including a flange at a distal end thereof;

a rotary tool attached to said flange, said rotary tool including a collet chuck having a chuck nut;

rotating shaft locking means for fixing a rotating shaft of said rotary tool attached to said flange; and program control means for operating the robot and said rotating shaft locking means according to a program so that the chuck nut is fixed by chuck nut fixing means provided on bladed tool storage means in which the bladed tool is stored and the rotating shaft of said rotary tool is fixed by said rotating shaft locking means, and said chuck nut and said rotating shaft are rotated relatively to close and open said collet chuck so that the bladed tool is mounted and demounted to and from said rotary tool.

3. An automatic bladed tool changer to automatically mount and demount a bladed tool, comprising:

a robot having an arm including a flange at a distal end thereof;

a rotary tool attached to said flange, said rotary tool including a collet chuck; and control means to open and close said collet chuck to mount and demount the bladed tool to and from said rotary tool, the robot being controlled according to a program by said control means, wherein said control means has means for performing bladed tool tightening of said collet chuck by said robot operation using a predetermined torque limit value set on the robot.

4. An automatic bladed tool changer to automatically mount and demount a bladed tool, comprising:

a robot having an arm including a flange at a distal end thereof;

a rotary tool attached to said flange, said rotary tool including a collet chuck; and control means to open and close said collet chuck to mount and demount the bladed tool to and from said rotary tool, the robot being controlled according to a program by said control means, wherein said control means has means for estimating a disturbance torque of a tightening shaft by using an observer when the bladed tool tightening of said collet chuck is performed by said robot operation and means for judging that the tightening is completed when the estimated value exceeds a predetermined threshold value.

5. The automatic bladed tool changer according to claim 2, wherein:

said rotating shaft locking means comprises a cylinder to reciprocate a stopper to engage with said rotating shaft and lock said rotating shaft;

said stopper is pressed against said rotating shaft by driving said cylinder repeatedly; and said rotating shaft is rotated slightly and is brought to a rotation phase in which said stopper engages with said rotating shaft and is fixed; and when detected that said rotating shaft is fixed to said stopper by monitoring the stroke of said cylinder, said rotating shaft is fixed in position, assuming that locking of the rotating shaft has been completed.

6. The automatic bladed tool changer according to claim 1, wherein said control means sets a bladed tool extension to a predetermined value by pressing said bladed tool against a bladed tool positioning stopper by operating the robot.

7. An automatic bladed tool changer to automatically mount and demount a bladed tool, comprising:

a robot having an arm including a flange at a distal end thereof;

a rotary tool attached to said flange, said rotary tool including a collet chuck; and control means to open and close said collet chuck to mount and demount the bladed tool to and from said rotary tool, the robot being controlled according to a program by said control means, wherein said control means stores in storage means a stored position comprising a holding position or a position returned from said holding position by a predetermined rotational angle, after said bladed tool is tightened and held by said collet chuck by said robot operation, and uses the stored position as a start position for the bladed tool removing operation when said bladed tool is removed from said collet chuck.

8. The automatic bladed tool changer according to claim 1, wherein said control means is a robot controller.

9. A bladed tool changer mounted on an industrial robot, comprising:

a fixture having a first member mounted on a flange of the industrial robot and a second member fixed to or integral with the first member and extending perpendicular to the first member;

a first actuator having a stationary member fixed to a side of said second member and a movable member which moves along the side of the second member;

a rotary tool having a rotary shaft, fixed to the movable member of the first actuator;

a second actuator having a stationary member fixed to an end of the second member and a movable member which moves in the direction perpendicular to the side of the second member;

a collet chuck to hold a bladed tool, mounted on the end of the rotary shaft of the rotary tool; and an engaging structure, provided on the end of the movable member of the second actuator which engages with the rotary shaft of the rotary tool to prohibit the rotary shaft to rotate.

10. The bladed tool changer according to claim 9, wherein the flange comprises a face and the rotary shaft comprises an axis perpendicular to the face of the flange.

11. A tool changer comprising:

a robot;

a rotary tool attached to said robot, the rotary tool comprising a collet chuck having a chuck nut to open and close said collet chuck;

a rotating shaft locking unit attached to said robot; and a control unit rotating said chuck nut and said rotating shaft relative to each other to close and open the collet chuck to mount and demount a bladed tool from said rotary tool and to fix the chuck nut to a chuck nut fixing unit provided on a bladed tool storage unit in which the bladed tool is stored, the control unit operating according to a program.

* * * * *